Patented Sept. 7, 1954

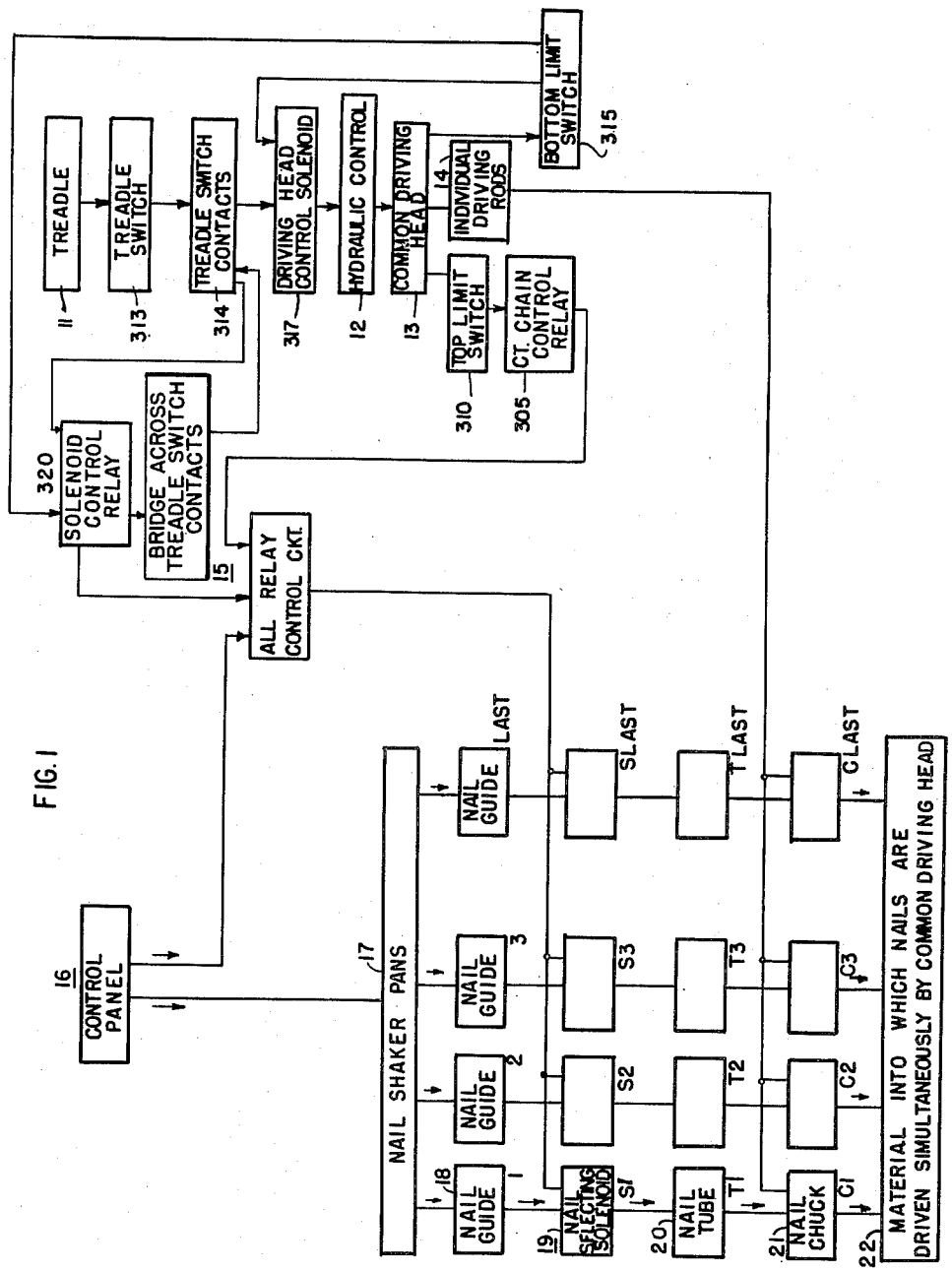

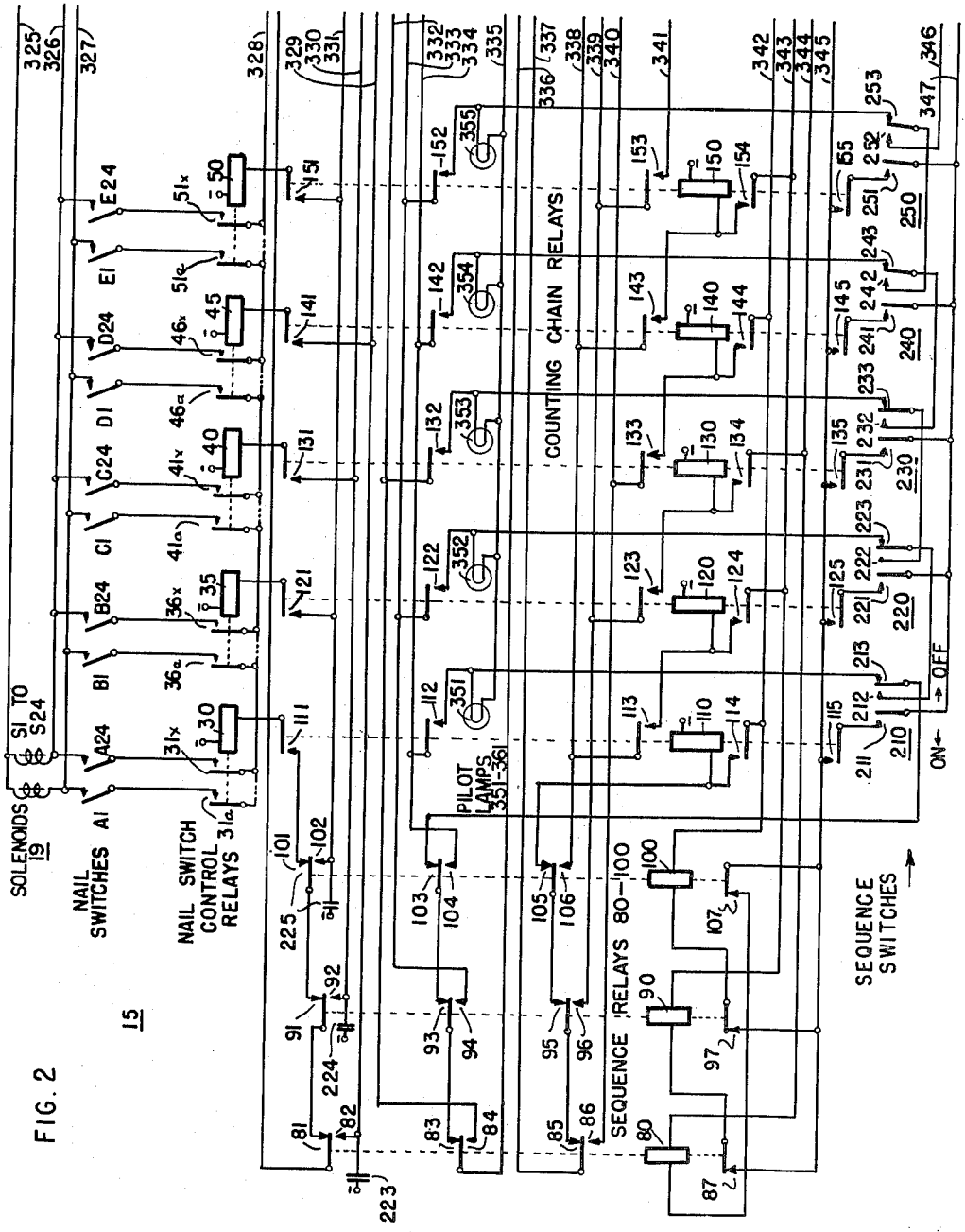

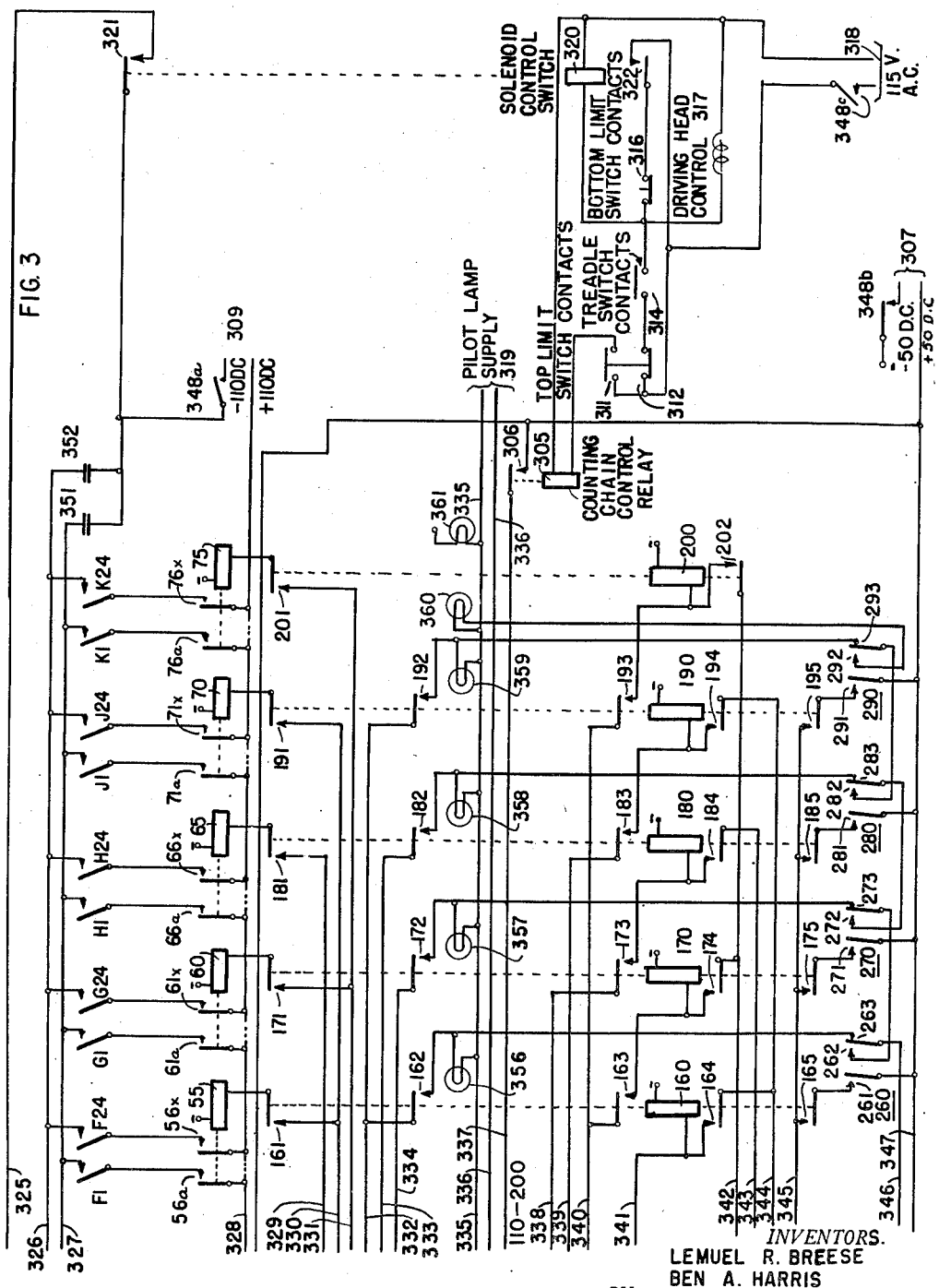

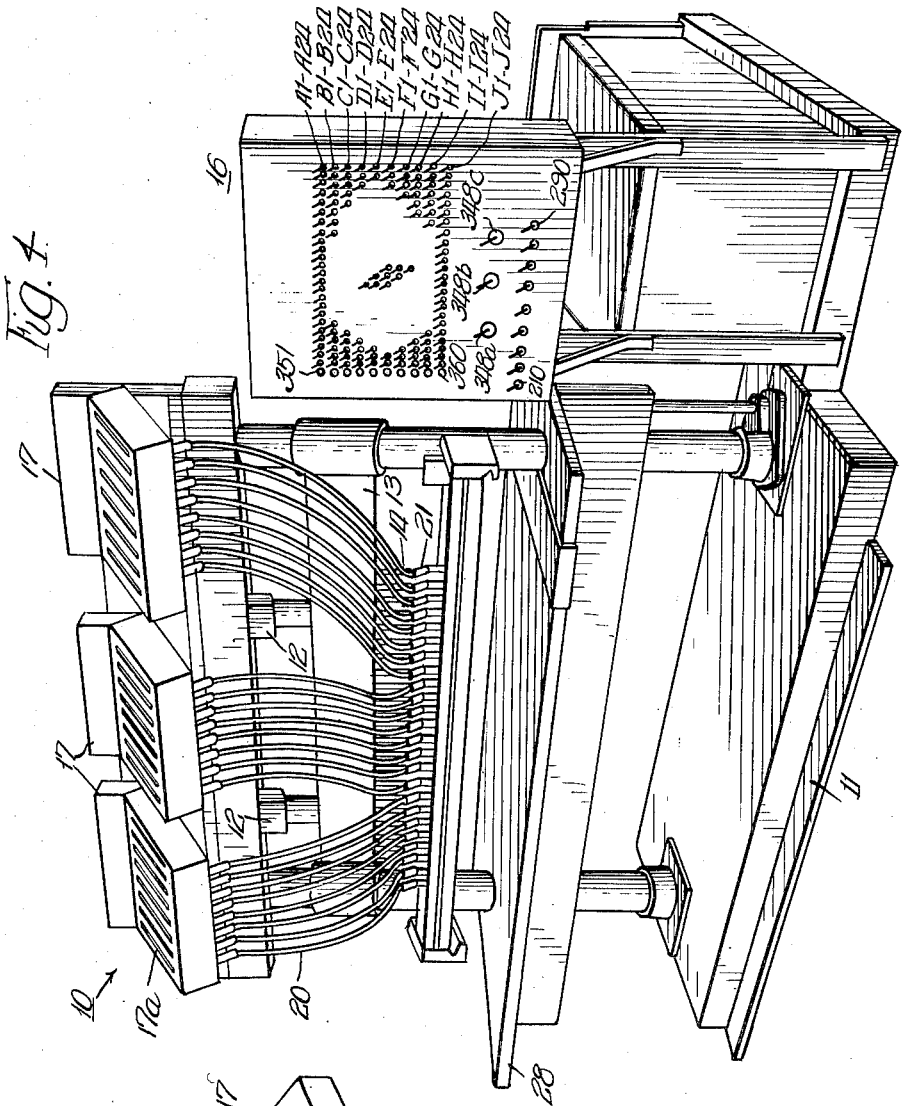
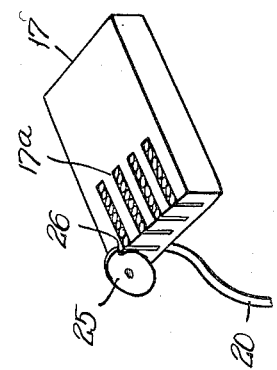

2,688,438

UNITED STATES PATENT OFFICE 2,688,438

CONTROL CIRCUIT FOR AUTOMATIC NAILING MACHINES

Lemuel R. Breese and Ben A. Harris, Galion, Ohio, assignors to The North Electric Manufacturing Company, Galion, Ohio, a corporation of Ohio Application June 12, 1952, Serial No. 293,227

26 Claims. (Cl. 1—16)

This invention relates, in general, to a control system for automatic nailing machines, and particularly to a control system for accomplishing the automatic selection and delivery of nails to the machine according to each of a plurality of patterns which have been preselected on an associated control board.

The packaging of various types of materials in a rapid, economical and practical manner is a problem which has heretofore offered an especial challenge to manufacturers in all fields of industry, and there has been developed, as a result of this challenge, a number of extremely complex and expensive automatic packaging units. There has been developed for use in the packaging of heavier materials, for example, various types of automatic equipment which are adapted to assemble wooden containers or crates in a series of manually initiated and supervised operations. In such equipment, the material to be assembled into box form is fed to the machine in a given sequence, and the machine is operative to automatically select and drive the nails into the material in each of a series of predetermined patterns, whereby in each cycle of the machine the entire assembly of a desired container is effected. It is, of course, apparent that in the assembly of a container the several patterns in a cycle will probably be of different configurations. Further in the use of the equipment for manufacturing different types of containers, the individual patterns and the number of operations in a cycle will vary with the nature of the container. Accordingly, a machine of this type must be extremely flexible in its adaptability and must lend itself to ready adjustment, whereby in a changeover to accommodate these variations in patterns and cycles the adjustments may be quickly and expeditiously accomplished.

Although various types of automatic nailing machinery have been provided heretofore which are operative to effect the fabrication of a container in this manner, the equipment has been generally such that the utility, adaptability and flexibility thereof has been inherently limited, and, in fact, has been of such a limited nature as to render the variations of cycles and of patterns extremely cumbersome. One of the better known forms of equipment, for example, includes a selective mechanism comprising a series of drums or discs which are secured by screws to a controlling shaft, and a number of screws or projections are removably secured thereto in given combinations to control the delivery of the nails in the desired pattern in each of the machine operations. Thus, in the changing of the patterns for the operation and in the adjusting of the number of cycles of the machine, one lug or projection had to be removed, replaced and redistributed for each change to be made. It is immediately apparent that whenever a changeover of even the slightest moment is to be made, the machine must be shut down for a comparatively long period. Such equipment therefore is extremely impractical and inefficient in the field. Further, the equipment is somewhat limited in its flexibility.

Another form of control system which has been utilized in the field heretofore comprises an electrical-mechanical arrangement in which a series of discs or wafers having a number of projections on the periphery thereof are arranged in parallel fashion on a common rotating shaft, and the operated or nonoperated condition of an associated control switch determined whether a particular projection on the periphery of a wafer operated a nail selective solenoid. While such arrangement was a definite improvement over the more complicated and cumbersome mechanical arrangement used prior thereto, the high speeds and heavy current values inherent in the equipment caused serious overheating and mechanical wear which resulted in rapid and accelerated breakdown of the units, the life of these units being frequently in the order of less than six or eight months.

It is a particular object of this invention, therefore, to provide a control system which permits the ready adjustment of a nailing machine of this general type, whereby the number of operations in a cycle and the pattern of each operation in the cycle may be rapidly and expeditiously accomplished.

According to a particular feature of the invention, the problem of providing a convenient arrangement for setting up the patterns for a number of operations, each of which patterns may be different, is solved by the provision of an all-relay control system which is adapted to be controlled by the registration of the desired patterns on the associated switches of a control board, and in which the number of operations in the cycle is determined by the operation of corresponding sequence switches located thereon.

A feature of this invention is the manner in which the adjustment of the respective patterns in a cycle and the number of operations in a cycle is accomplished by merely operating switch members on a given control board. A further feature of the invention is the comparatively inexpensive manner in which such type control is provided, and the reliable and dependable nature of the controls which are utilized in the provision of this more flexible type control system.

As will become apparent hereinafter, the desirable operating characteristics normally inherent in an all-relay system are also included in the disclosed control arrangement, such characteristics including minimum mechanical wear, the inherent ability to carry high current values without overheating, the ability to operate at high speeds without mechanical deterioration, and quiet, dependable type operation.

These and other advantages of the invention will become more apparent now with reference to the following specification, claims and drawings, in which:

Figure 1 is a schematic diagram setting forth the novel control system in block form and its manner of cooperation with the various elements of a known type of nailing machine;

Figures 2 and 3 disclose a schematic circuit diagram of the control system of the invention;

Figure 4 is a perspective sketch of the control board for housing the novel control system and its manner of cooperation with the equipment of the conventional type nailing machine; and Figure 5 illustrates one specific manner of effecting selection of a nail from the shaker pan and delivery thereof to the appropriate tube by a solenoid member.

In the drawings the relays are shown in a de-energized condition with their armatures restored. With energization of a relay the associated armatures thereon (as indicated by the dotted lines) are moved toward the winding of the relay. With deenergization of the relay the associated armatures return to the position illustrated. The positive side of the line is connected to ground in this disclosure.

The limit switches in the drawings are shown in their normal positions, i. e., the position assumed when the driving head is at rest.

General description

The novel control system of the invention is extremely flexible in use, and is adapted for operation with any of the well known types of nailing machines, its manner of use with one particular type of machine being illustrated in schematic and perspective form in Figures 1, 2 and 4. As shown in Figure 1, the nailing machine 10 basically comprises a series of three hopper or nail holder boxes 17, each of which may have eight slotted nail chutes 17a (Figure 4) in which nails are carried for selection by an associated solenoid member such as S1 (Figure 1) of group 19 for delivery through an individual tube such as T1 of group 20 to an associated nail chuck such as C1 of group 21. A control board 16 is mounted adjacent the nailing machine and is arranged to house the novel control circuit 15. The control circuit 15, shown in detail in Figures 2 and 3, is operative to control automatically the nail selecting solenoids 19 to feed the nails through the tubes 20 to the chucks 21 in a given pattern for each operation of the machine, the patterns desired for each operation being determined by the configurations registered on nail switches A1—A24, B1—B24 etc., on the control board.

A support bed 28 on the nailing machine provides suitable means for positioning the material to be nailed in each operation, the actual nailing of the material being effected with the operation of a treadle 11 by the machine attendant, which in turn controls associated hydraulic equipment 12 to urge a driving head 13 downward to drive the nails which are disposed in the chucks 21 into the material which is positioned on the bed 28.

In most conventional nailing machines, the chucks 21 are adjustable so that various spacings may be provided between the nails to be driven. As will be brought out in more detail hereinafter, the illustrated machine is capable of selecting, feeding and driving up to 24 nails in any given operation, and is adjustable to provide 10 successive operations in any one cycle. The control board also mounts a series of pilot lamps 351–360 which are operative to indicate to the attendant at all times the particular configuration of nails which is set up in the chucks, the pilot lamp for a group being illuminated as the nails are delivered to the chuck members in the particular pattern represented thereby.

General operation

The general purpose of the novel nailing machine control system set forth hereat is to effect the selection of nails according to the pattern registered on control board 16 for each of a series of nailing operations, and to select these patterns in the proper sequence and number as determined by the particular cycle which is registered on the control board 16. The manner in which the general operation of the nailing machine equipment is accomplished by the control equipment is briefly set forth hereat.

The particular pattern to be provided in any given operation, and the number of operations to be effected in any given cycle are determined by the switch settings which are made on the control board 16 prior to energization of equipment. More specifically, control board 16 comprises 9 "on"-"off" switches 210–290, inclusive, each of which is alternatively operative to an "on" or an "off" position, and the number of operations to be effected in each cycle of the equipment is determined by the number of sequence switches 210–290 which are operated to the "on" position. Assuming four operations are required to effect the fabrication of a given box, the first three sequence switches 210–230 will be moved to the "on" position, and the remaining six sequence switches 240–290 will be moved to the "off" position. Similarly, if three operations are to be effected in each cycle, the first two sequence switches 210, 220 are moved to the "on" position, and the remaining seven sequence switches 230–290 are moved to the "off" position, etc.

The particular pattern of the nails to be fed in each of the operations of a cycle which is now registered by the sequence switches, is in turn determined by the adjustment of each of a plurality of groups of nail switches, A1—A24, B1—B24, C1—C24, etc., which are located on the control board 16, the board specifically locating ten separate rows of nail switches A–J inclusive, each row having twenty-four switches each. In this manner, each nail switch of a row is individual to a corresponding one of the twenty-four chucks on the machine. The switch members A1—A24, B1—B24 etc., are alternatively operated between an "on" and an "off" position, the switch being effective with its movement to the "on" position to cause a nail selecting solenoid associated with the corresponding chuck on the machine to feed a nail into the chuck as the group is rendered effective. Therefore, in the setting up of a nail configuration to be delivered for the first operation, the nail switches corresponding to the particular chucks in which nails are desired in the first nailing operation are moved to the "on" position. For example, if the pattern is to include nails in chucks 2 and 18 in the first operation, the nail switches A2 and A18 in the first row on the control board will be moved to the "on" position. A similar operation of the switch members for each of the groups to be rendered effective in a given cycle is made upon the control board prior to the energization of the equipment.

Further adjustment of the pattern may be effected by movement of the chucks relative to each other on the machine, the chucks being laterally displaceable in the conventional manner.

As will be seen hereinafter, the control system is effective to deliver the nails to the tubes 21 for a succeeding operation during the period that the driving head is in the act of driving home the nails in the chucks which were selected for the previous operation. Accordingly, if the equipment has been used previously in the assembly of containers in which a different configuration of nails was provided, the nails now in the chucks will be of the wrong configuration, and it is first necessary to flush these nails from the chucks. With reference to Figures 1 and 4, such operation is basically achieved by operation of the main power switches 348a, 348b, and 348c, to the "on" position and the movement of the treadle switch 11 by the attendant to operate treadle switch contacts 314 which control the solenoid control switch 320 and the driving head control solenoid 317.

As the driving head control solenoid 317 operates, it controls the hydraulic control unit 12 to operate the common driving head 13 in a downward movement whereby the individual driving rods 14 descend to drive the nails of the previous operation from the chucks 21. Inasmuch as there has been no material positioned on the bed 28, the nails will fall harmlessly out of the chucks and no nailing operation will be effected.

As the driving head 13 descends it is also effective to operate the top limit switch 310 which in turn opens the circuit through the treadle switch contacts and operates the auxiliary counting chain control relay 305 to initiate operation of the all-relay control circuit 15. Counting chain relay 110 in the all-relay control circuit 15 operates and causes energization of the particular solenoids 19 which correspond to the operated ones of the nail switches A1—A24 on the control board 16, whereby nails are dropped into the tubes corresponding to the particular switches A1—A24 which are in the operated position.

As the driving head 13 approaches the bottom limit of its downward movement, it effects operation of the bottom limit switch 315 which effects release of solenoid control switch 320 and the driving head control solenoid 317, whereby the hydraulic control system 12 is operated to move the driving head 13 in an upward stroke. As the driving head ascends, the nails now in the tubes 20 are loaded into the chucks 21, whereby the head is now loaded to effect the first nailing operation registered on the control board 16. As the common driving head 13 approaches the upward limit of its upward stroke, the top limit switch 310 is reoperated releasing relay 305 and relay 100 in the control circuit 15 operates to complete an energizing circuit for the pilot lamp 351 which is associated with the first group of nail switches. The illuminated lamp 351 indicates to the attendant that the machine is now ready to effect the first nailing operation of the particular cycle set up on the control board 16.

The attendant now positions his material on the machine bed 28 and operates the treadle 11 whereby the driving head is operated as described to drive home the nails in the chucks in accordance with the pattern set up on the first group of nail switches A1—A24 on the control board 16. As the driving head descends the second group of nail switches B1—B24 are rendered effective, and the nail selecting solenoids are operated to deliver the nails to the nail tubes 20 in accordance with the pattern set up on the second group of nail switches B1—B24 on the control board 16. As the driving head ascends following the driving home of the first pattern of nails, the second pattern of nails now in the tubes is moved to the nailing chucks 21, and the pilot lamp 352 is illuminated to indicate to the attendant that the equipment is now ready for the second nailing operation.

The fabrication of the box is continued in this manner, the attendant feeding the material to the bed 28 as it is to be nailed in a sequence which corresponds to the particular nailing operations which have been registered on the control board 16. When the sequence of operations registered on the board has been completed, the equipment automatically recycles and prepares the nailing machine for the first operation of the registered cycle.

The selection of a nail by the nail selecting solenoids may be effected in any conventional manner, one particular method comprising the use of an arrangement as shown in the patent to Harriett No. 2,197,363, which issued April 16, 1940. A specific nail selecting arrangement which lends itself to ready modification is shown in Figure 12 of the drawing for said patent, the modification comprising the substitution of nail solenoids 19 for the units 28, 20, 30a and 31. That is, the solenoids 19 of this disclosure may be of the plunger type, and such plunger may be mounted at right angles to bar 51 in the patent whereby with energization of the solenoid and the inward movement of the plunger, bar 51 is operated to the left to effect the deposit of a nail into the chute.

Another manner of effecting nail selection is shown in Figure 5 of the drawings of this disclosure in which rotary solenoids are used to operate nail picking cam members 25, these cams having a detent 26 which normally engages the first nail in the channel. As the solenoid is energized the cam picks off the first nail in the chute of box 17 and moves same into the nail tube 20. During rotation, the enlarged periphery portions of the cam prevent the introduction of further nails into the chute. Other known conventional nail selecting apparatus may be utilized with the novel control apparatus of this invention.

A particular feature of the invention is the manner in which the control panel may be deenergized by the movement of the energizing switches 348a, 348b and 348c to the "off" position whereby the relay equipment of the arrangement is deenergized and a new cycle may be initiated. Such arrangement is of particular utility when a bent or crooked nail enters a chuck and a particular operation of the cycle is rendered ineffective by reason thereof. With the occurrence of such an event in machines of the type known heretofore, it has been necessary to finish out the cycle registered upon the control board before a new cycle could be initiated. Obviously time and material was wasted while such recycling was effected.

Other advantages and features of the present arrangement will become apparent from the following more specific disclosure of the equipment operation.

Specific operation

Assuming the machine attendant desires to assemble a wooden container in which four separate nailing operations are performed, each of which comprises the feeding and driving of a given number of nails in a preselected pattern, the several patterns being the same as or different from one another, the first three sequence switches, 210, 220 and 230, must be operated to the "on" position and the remaining sequence switches, 240 to 290, must be operated to the "off" position. (See Figs. 2 and 3.) If the number of operations in each cycle is two, only the first sequence switch 210 is operated to the "on" position; for a three operation cycle, the first two sequence switches 210 and 220 are operated to the "on" position, etc. If the number of operating per cycle is one, no sequence switches will be operated.

Following adjustment of the sequence switches 210, 220, etc., in such manner to determine the number of operations in each cycle, the individual nail switches 324 associated with each one of the sequence switches are operated in accordance with the particular nailing configuration desirably effected for the corresponding operation in the cycle. For example, assuming that the nail configuration as driven home in the first operation is to include nails 1, 3, 11, 12, 13, 22 and 24, nail switches A1, A3, A11, A12, A13, A22 and A24 associated with sequence switch 210 will be moved to their "on" or closed position. Assuming nails 1, 4, 8 and 12 are to be driven home in the second operation, nail switches B1, B4, B8 and B12 associated with the second sequence switch 220 are operated to their "on" or closed position. Assuming nails 3, 12 and 15 are to be driven home in the third pattern, the nail switches C3, C12, and C15 associated with the third sequence switch 230 are operated to the "on" position. Assuming nails 6, 7 and 8 are to be driven home in the fourth pattern, the nail switches D6, D7, and D8 associated with the fourth sequence switch 240 are moved to the operated position.

At this time, power switches 348a, b and c, sequence switches 210, 220, 230 and nail switches A1, A3, A11, A12, A13, A22 A24, B1, B4, B8, B12, C3, C12, C15, D6, D7 and D8 are operated.

Assuming that the nailing equipment has been utilized previously for other nailing operations, it will be apparent that a given nailing configuration will be set up in the chucks and it is necessary to remove the nails therefrom prior to initiation of the first cycle now set up on the control board. The operator is informed of the improper chuck loading as the equipment is turned on by the illuminated condition of one of the pilot lamps. The particular lamp illuminated is determined by the number of operations in the cycle newly set up on the control board.

Since in the present example the board is set up to provide four operations in each cycle, the fourth pilot lamp 354 will be in the energized condition, the energizing path extending from one side of the lamp supply source 319 over conductor 335, lamp 354, contacts 243, 232, 222, 212, 103, 93, 83, and conductor 336 to the other side of the lamp supply source 319. It is, of course, apparent that a different pilot lamp will be illuminated if the number of operations in the cycle set up on the control board is other than four. Thus, if there were to be five cycles in the operation, sequence switches 210-240 would be in the "on" position and accordingly the fifth pilot lamp 355 would be energized as the equipment is turned on, etc.

As the operator is thus notified that the nails in the chucks are other than that desired for the first nailing operation, the attendant operates the treadle switch without inserting his material into position on the bed and the head descends to flush the nails from the chucks and to prepare the machine automatically for the first nailing operation of the cycle set up on the control board. That is, as the attendant operates the treadle 11 operating treadle switch 313 to effect the removal of the unwanted nails from the chucks, treadle switch contacts 314 are closed to complete an energizing circuit from the alternating current supply source 318 to the driving head control solenoid 317 in parallel with the solenoid control switch 320, the energizing circuit extending from one side of the supply source 318 over contacts 348c, 312, 314, driving head control solenoid 317 and solenoid control switch 320 in parallel to the other side of the supply source 318. It should be noted that with the driving head in the up position, limit switch contacts 311 are open and its contacts 312 are closed.

Solenoid control switch 320 operates and at its contacts 321 connects one side of supply source 309 to the nail selecting solenoids 19 to prepare same for operation in the selection of the proper nails for the first operation of the cycle. The bottom limit switch contacts 316 are closed when the driving head 13 is in the normal or up position. Solenoid control switch 320 in operating is therefore also effective at its contacts 322 to bridge the treadle switch contacts 314 to provide a self holding circuit independent of contacts 314, the holding circuit extending from one side of supply source 318 over contacts 322 and the closed contacts 316 of the bottom limit switch 315 to the solenoid control switch 320 and the driving head control 317 in parallel and the other side of supply source 318.

Driving head control solenoid 317 thus energized operates the hydraulic system to move the driving head in a downward stroke, whereupon top limit switch 310 is operated to open its contacts 312 to interrupt the original energizing circuit completed by the treadle switch 314, and its contacts 311 are closed to complete an operating circuit for the counting chain control relay 305, the energizing circuit therefor extending from one side of the supply source 318 over contacts 348c, contacts 311, and the winding of relay 305 to the other side of supply source 318. The driving head control solenoid 317 and solenoid control switch 320 are held operated at this time independent of the position of the treadle switch 314 over the previously described holding circuit. In this manner an operation once started is always completed independent of the time the operator maintains the treadle switch 313 operated.

The counting chain control relay 305 operates and at its contacts 306 completes an operating circuit for the first counting chain relay 110 in the control chain, the circuit extending from the positive side of supply source 307 over contacts 306, conductor 337, contacts 85, 95, 105 and the winding of relay 110 to negative battery. It is noted that the negative battery symbol positioned adjacent the one conductor for each relay of the control network shown in Figures 2 and 3 is a symbolic representation of its actual connection to the negative conductor of the 50 volt D. C. supply source 307.

Counting chain relay 110 operates and at its contacts 111 completes an operating circuit for nail switch control relay 30 associated with the nail switches A1 to A24 which determine the nails to be delivered to the chucks for the first operation; at its contacts 112 prepares a circuit for the first pilot lamp 351; at its contacts 113 prepares a circuit for the second counting chain relay 120 and at its contacts 114 and 115 completes a series energizing circuit for itself and sequence relay 100 which is presently rendered ineffective by the shunt condition provided by the original energizing circuit for counting chain relay 110. That is, although the operating circuit extending from negative battery over the winding of relay 110, contacts 114, the winding of relay 100, contacts 97, 115, 210 to positive battery is completed, the ground extending over the original energizing circuit for relay 110 (ground, 306, C337, 85, 95, 105) as extended to relay 110 is also extended to 100 by contacts 114. With ground thus connected to both sides of relay 110, the relay is maintained inoperative (in the restored condition) until such time as the ground extending over the original energizing circuit is subsequently removed. As will appear hereinafter, this does not occur until the driving head approaches the end of its upward stroke.

Nail switch control relay 30 operates over a circuit extending from negative battery over the winding of relay 30, contacts 111, 101, 91 and 81, C328 and the positive side of supply source 307, and at its contacts 31A to 31X closes a circuit for the solenoids S1—S24 associated with the operated ones of the nail switches A1 to A24. In the given example, nail switches A1, A3, A11, A12, A13, A22 and A24 on the control board were operated to the "on" position and accordingly solenoids S1, S3, S11, S12, S13, S22 and S24 are now operated to move a nail into each of their associated nail tubes for use in the first nailing operation.

During the downward movement of the driving head therefore, solenoid 317 and relay 320 have been operated to complete a circuit which insures operation of the driving head to drive home the nails in the chuck and the return thereof of its normal position; the top limit switch contacts 312 have been opened to interrupt the treadle-controlled starting circuit; and contacts 311 have been closed to energize the counting chain control relay 305. Relay 305 operates and completes the energizing circuit to the first counting chain relay 110 which operates and completes an operating circuit for the nail switch relay 30. Relay 30 operates to complete energizing circuits to the solenoids S1, S3, S11, S12, S13, S22 and S24 associated with the operated switches A1, A3, A11, A12, A13, A22 and A24 of the first group.

As the driving head approaches the farthest point of its downward stroke, the nails in the chucks are discharged and a bottom limit switch 315 is operated by the descending head. The driving head drives the unwanted nails from the chucks and as the head approaches the lower limit of its movement, bottom limit switch 315 is operated thereby to effect at its contacts 316 the interruption of the holding circuit for the driving head control 317 and the solenoid control relay 320 which responsively restore. Solenoid control switch 320 at its contacts 321 interrupts the energizing circuit for the operated ones of the nail switches A1—A24 to restore same (solenoids S1, S3, S11, S12, S13, S22 and S24 in the present example). The driving head control solenoid 317 restores and controls the hydraulic system 12 to move the driving head upward toward its normal rest position. As the driving head returns toward its normal position, the nails which were placed in the appropriate nail tubes by solenoids S1 to S24 associated with the first operation now fall into the proper chucks in a manner well known in the art.

At this time the groups of nails which were in the chucks as the result of the previous operations of the machine have been discharged therefrom, and the driving head in its ascent to its normal position has caused the first pattern of nails as picked by solenoids S1, S3, S11, S12, S13, S22 and S24 to be placed in the chucks.

As the driving head approaches the uppermost point of its movement, the top limit switch is operated to close contacts 312 whereby the equipment is prepared for the second nailing operation, and to open contacts 311 to interrupt the energizing circuit for counting chain control relay 305 which restores and at its contacts 306 interrupts the aforedescribed shunting circuit for relays 100 whereby sequence relay 100 now energizes in series with the first counting chain relay 110 over the previously prepared energizing circuit. Such circuit extends from negative battery over the winding of relay 110, contacts 114, the winding of relay 100, contacts 97, 115, 211, and conductor 347 to the positive side of supply source 307.

Sequence relay 100 operates and at its contacts 101 interrupts the holding circuit for the first nail switch control relay 30, which restores and at its contacts 103 interrupts the energizing circuit for the fourth pilot lamp 354 and at its contacts 104 completes an energizing circuit for the first pilot lamp 351, the circuit extending from one side of the lamp supply source 319 over conductor 335, pilot lamp 351, contacts 112, 104, 93, 83 and conductor 336 to the other side of the lamp supply source 319.

Illumination of the first pilot lamp 351 informs the attendant that the machine is now ready to drive nails in the successive patterns of the cycle set up on the control board, and specifically is prepared to effect the first operation of the cycle.

At this time then, only sequence relay 100 and counting chain relay 110 are operated, the operated condition of these relays as the next cycle of the equipment is initiated by the attendant indicating to the control circuit that the second pattern of nails registered on the board is to be selected and fed into the tubes as the driving head descends to drive home the first pattern of nails which is in the chucks.

The material to be nailed in the first operation is now placed in position, and the attendant operates the treadle 11 which operates the treadle switch 313 to initiate the first nailing operation. As the treadle switch 313 is thus operated, treadle switch contacts 314 are closed to complete the energizing circuit for solenoid control switch 320 and the driving head control 317 in parallel as heretofore described.

As the driving head control solenoid 317 initiates the downward descent of the driving head, the solenoid control switch 320 at its contacts 322 simultaneously locks the equipment to insure the completion of the operation now initiated and at its contacts 321 prepares the energizing circuit for nail selecting solenoids 19 associated with the second nail selecting operation.

As the driving head descends the top limit switch 310 is operated and at its contacts 311 completes an operating circuit for the counting chain control relay 305 and at its contacts 312 interrupts the original energizing circuit for solenoid control switch 320 and the driving head control 317 which is now held operated over the holding circuit controlled by the bottom limit switch 315.

Counting chain control relay 305 operates and at its contacts 306 completes an operating circuit for the second counting chain relay 120, the circuit extending from negative battery over the winding of relay 120, contacts 113, 106, 95, 85, conductor 337, and contacts 306 to the positive side of supply source 307.

The second counting chain relay 120 operates and at its contacts 121 completes an operating circuit for the second nail switch control relay 35, at its contacts 122 prepares an energizing circuit for the second pilot lamp 352, at its contacts 123 prepares a circuit for the third counting chain relay 130, and at its contacts 124 and 125 prepares a series operating circuit for sequence relay 90, the sequence relay 90 being held inoperative at this time by reason of the ground connected to both sides thereof, that is, over conductors 337 and 347.

The second nail switch control relay 35 operates over a circuit extending from negative battery over the winding of relay 35, contacts 121, 102, 91, and 81 to the positive side of supply source 307, and at its contacts 36A to 36X inclusive is operative to complete energizing circuits for the particular ones of the nail switches in the second group (B1—B24) which were moved to the closed position in the adjustment of the control board effected prior to the original energization of the equipment, i. e., B1, B4, B8 and B12. Solenoids S1, S4, S8 and S12 which are associated with the preset nail switches B1, B4, B8 and B12 are now energized to drop the nails to be used in the second operation into the corresponding nail tubes. The energizing circuit for the solenoids thus energized extends from the negative side of the supply source 309 over contacts 348A and 321, conductor 325 in parallel over the coils of the prepared solenoids S1, S4, S8 and S12, nail switches B1, B4, B8 and B12, contacts 36a, 36d, 36h, 36l, and conductor 328 to the positive side of supply source 309.

As the driving head approaches the downward limit of its movement, it drives the first selected pattern of nails held by the chucks into the material and effects operation of the bottom limit switch 315 to open contacts 316 and thereby interrupt the energizing circuits for the driving head control solenoid 317 and the solenoid control relay 320. The driving head control solenoid 317 deenergizes to cause the hydraulic control to move the driving head upward and the solenoid control relay 320 restores to open its contacts 321 and thereby interrupt the energizing circuit for the operated solenoids in the second group to restore same. As the driving head commences its upward movement, the second pattern of nails which are in the tubes now fall into the proper chucks in the conventional manner, and as the head approaches the top of its upward stroke, the top limit switch 310 is operated to reclose contacts 312 in preparation for a succeeding nailing operation, and to open contacts 311 to interrupt the operating circuit for the counting chain control relay 305. Counting chain control relay 305 restores and at its contacts 306 interrupts the original energizing circuit for the second counting chain relay 120, whereupon the ground shunt imposed upon the series circuit for second sequence relay 90 and relay 120 is removed. Sequence relay 90 now operates in series with the chain relay 120, this operating circuit extending from negative battery over the winding of relay 120, contacts 124, the winding of relay 90, contacts 87, 125, and 221, and conductor 347 to the positive side of supply source 307.

The second sequence relay 90 in its operation is effective at its contacts 91 to interrupt the holding circuit for the second nail switch control relay 35 to restore same, at its contacts 93 is effective to interrupt the energizing circuit for the first pilot lamp 351 to extinguish same, and at its contacts 94 is effective to complete an energizing circuit for the second pilot lamp 352 to indicate to the attendant that the chucks are loaded with nails as desired for the second nailing operation. The circuit for the second lamp 352 extends from one side of the lamp supply source 319 over conductor 335, lamp 352, contacts 122, contacts 94, 83, and conductor 336 to the other side of the lamp supply source 319.

Sequence relay 90 is effective at its contacts 97 to interrupt the holding circuit for the first sequence relay 100 and the first counting chain relay 110 to effect the restoration thereof. At this point the first nailing operation is completed and the second pilot lamp is illuminated to indicate that the nailing machine is prepared to effect the second nailing operation. At this time only counting chain relay 120 and sequence relay 90 are energized, the energized condition of these relays controlling the selection of the third pattern of nails as the attendant initiates the second cycle of the machine, and the driving head is moved downward in the cycle to drive home the second pattern of nails now in the chucks.

The material to be nailed in the second operation is now placed in position and the attendant operates the treadle switch to initiate the second nailing operation. As the treadle switch 313 is operated, its associated contacts 314 are closed to complete the energizing circuit to the solenoid control switch 320 and the driving head control member 317 in the manner heretofore described. The driving head control member 317 controls the hydraulic equipment to initiate downward movement of the driving head and the solenoid control switch 320 operates to prepare the energizing circuit for the third group of nail selecting solenoids to complete a holding circuit for the solenoid control switch 320 and the driving head control member 317 which extends over the bottom limit switch contacts 316 independent of the treadle switch contacts 314, whereby completion of the initiated nailing operation is insured.

With the downward movement of the driving head, the top limit switch 310 is operated to open contacts 312 to thus interrupt the original energizing circuit for the solenoid control switch 320 and the driving head control solenoid 317, these members being maintained energized over the holding circuit established over the bottom limit switch contacts 316. Simultaneously, the top limit switch contacts 311 are closed to complete an operating circuit for the counting chain control relay 305.

Counting chain control relay 305 operates and at its contacts 306 completes an energizing circuit for the third counting chain relay 130, the energizing circuit extending from negative battery over the winding of relay 130, contacts 123, 96, 85, conductor 337 and contacts 306 to the positive side of supply source 307.

The third counting chain relay 130 operates and at its contacts 131 completes an operating circuit for the third nail switch control relay 40, the circuit extending from negative battery over the winding of relay 40, contacts 131, 92, and 81 to the positive side of supply source 307; and at its contacts 132 prepares an energizing circuit for the third pilot lamp 353, at its contacts 133 prepares an energizing circuit for the fourth counting chain relay 140, and at its contacts 134 and 135 prepares a series operating circuit for itself and the third sequence relay 80 which series circuit is presently shunted by the original energizing circuit for the third counting chain relay 130.

The third nail switch control relay 40 operates and at its contacts 41A to 41X inclusive completes an energizing circuit for those solenoids associated with the nail switches of the third group which are in the closed position as a result of the initial adjustment of the control panel prior to the energization of the equipment (C3, C12 and C15 in the present example). The solenoids S3, S12 and S15 now operate over a circuit extending from the negative side of supply source 309, contacts 348a and 321, conductor 325, the solenoid coils, the closed nail switches of the third group, the corresponding contacts of the nail switch control relay 40, conductor 328 and the positive side of supply source 309. The energized ones of the solenoids (S3, S12 and S15) operate to drop a nail into their associated tubes in preparation for use in the third nailing operation.

As the driving head approaches the lower limit of its downward movement, it drives the second pattern of nails which is now disposed in the chucks into the positioned material and operates the bottom limit switch 315 to open its contacts 316 and thereby effect the release of solenoid control switch 320 and the driving head control solenoid 317. As the solenoid control switch 320 restores, it is effective at its contacts 321 to interrupt the energizing circuit for the operated ones of the solenoids S3, S12 and S15 associated with the third operation and as driving head control solenoid 317 restores it controls the hydraulic system to move the driving head in its upward stroke.

As the driving head moves toward its upward position, the third selected pattern of nails in the tubes now drop into the proper chucks and the top limit switch 310 is operated to close contacts 312 to prepare the treadle switch for use in initiation of the next nailing operation and to open contacts 311 to interrupt the energizing circuit for the counting chain control relay 305 which responsively restores to open its contacts 306 and thereby interrupt the original energizing circuit for the third counting chain relay 130. The shunt for the series operating circuit for the third counting chain relay 130 and the sequence relay 80 is thus interrupted, and sequence relay 80 now operates in series with the third counting chain relay 130 over a circuit extending from negative battery over the winding of relay 130, contacts 134, the winding of relay 80, contacts 107, 135, 231, and conductor 347 to the positive side of supply source 307.

The third sequence relay 80 in operating is effective at its contacts 81 to interrupt the holding circuit for the third nail switch control relay 40 to effect the restoration thereof, at its contacts 83 is effective to interrupt the energizing circuit for the second pilot lamp 352 to extinguish same, and at its contacts 84 is effective to complete an operating circuit for the third pilot lamp 353 to indicate to the attendant that the chucks are loaded for the third operation, the circuit extending from the lamp supply source 319 over conductor 335, lamp 353, contacts 132 and 84, and conductor 336 to the other side of the lamp supply circuit 319. Sequence relay 80 at its contacts 87 interrupts the holding circuit for the second counting chain relay 120 and the sequence relay 90 to effect the restoration thereof. At this time only counting chain relay 130 and sequence relay 80 are operated, the operated condition of these relays controlling the equipment to select the fourth pattern of nails with the next downward movement of the head to drive home the third pattern of nails now in the chucks.

The illumination of the third pilot lamp 353 at this time indicates to the attendant that the machine is now ready to drive the nails in the pattern preset on the control board for the third operation. The material to be nailed in the third operation is now placed in position and the attendant operates the treadle switch to initiate such operation.

As the treadle 11 and its associated switch 313 are operated, contacts 314 are closed to complete an energizing circuit to solenoid control switch 320 and the driving head control solenoid 317. Solenoid control switch 320 at its contacts 321 prepares the energizing circuit for the effective nail selecting solenoids in the fourth group and at its contacts 322 prepares the holding circuit for the driving head control solenoid 317 and itself independent of the treadle switch contacts 314.

The driving head control solenoid 317 controls the hydraulic system to initiate downward movement of the driving head, and as the driving head initiates such movement, the top limit switch 310 is operated to open contacts 312 to thereby interrupt the original energizing circuit for the driving head control solenoid 317 and solenoid control switch 320, which are maintained energized over the described holding circuit, and at its contacts 311 completes an operating circuit for the counting chain control relay 305.

Counting chain control relay 305 operates and at its contacts 306 completes an energizing circuit for the fourth counting chain relay 140, the energizing circuit extending from negative battery over the winding of relay 140, contacts 133, 86, conductor 337 and contacts 306 to the positive side of the supply source 307. Counting chain relay 140 operates and at its contacts 141 completes an energizing circuit for the nail switch control relay 45 associated with the fourth nailing operation; at its contacts 142 prepares the fourth pilot lamp for operation; at its contacts 143 prepares the fifth counting chain relay 150 for operation; and at its contacts 144 and 145 prepares a series operating circuit for itself and sequence relay 100.

Nail switch control relay 45 operates over contacts 141 and 82 and at its contacts 46a to 46x inclusive completes energizing circuits for the solenoids associated with the closed ones of the nail switches D1—D24 in the fourth group (D6, D7, D8, in the present example). The solenoids of the fourth group S6, S7 and S8 are thus energized over a circuit extending from the negative side of supply source 309 over contacts 348a and 321, conductor 325, the coils of the effective solenoids S6, S7 and S8, the closed ones of the nail switches D1—D24 in the fourth group (D6, D7 and D8), contacts 46a—46x and conductor 328 to the positive side of the supply source 309. Each of the energized solenoids S6, S7 and S8 operates to drop a nail into its associated nail tube in preparation for the fourth nailing operation.

As the driving head approaches the bottom limit of its movement, the nails in the chucks for the third nailing operation are driven into the material and the bottom limit switch 315 is operated to open its contacts 316, thereby interrupting the holding circuit for solenoid control switch 320 and driving head control solenoid 317. Solenoid control switch 320 releases and at its contacts 321 interrupts the energizing circuit for the operated nail selecting solenoids of the fourth group to effect the release thereof.

With interruption of the energizing circuit for the driving head control solenoid 317, the release of solenoid 317 controls the hydraulic system to urge the head on its upward movement and the nails deposited in the tubes by the fourth solenoid group are allowed to fall into the proper chucks.

With the approach of the driving head near its upward position, the top limit switch 310 is operated to close contacts 312 whereby the treadle switch is prepared to initiate a succeeding nailing operation, and the contacts 311 thereof are opened to interrupt the energizing circuit for the counting chain control relay 305 to restore same. Counting chain control relay 305 restores and at its contacts 306 interrupts the ground shunt for the first sequence relay 100.

As the shunt is removed, the first sequence relay 100 operates in series with the fourth counting chain relay 140 over a circuit extending from battery over the winding of the relay 140, contacts 144, the first sequence relay 100, contacts 97, 135, 231 and conductor 347 to the positive side of the supply source 307. It is noted that the fourth counting chain relay is operated over contacts 135 of the third counting chain relay and that the fourth sequence switch is in the "off" position. Accordingly the equipment cycle is now approaching an end.

Sequence relay 100 operates and at its contacts 107 interrupts the holding circuit for the third sequence relay 80 and the third counting chain relay 130 to effect the restoration thereof, and at its contacts 104 completes an operating circuit for the fourth pilot lamp 354 over a circuit extending from the lamp supply source 319 over conductor 335, lamp 354, contacts 142, 104, 93, 83 and conductor 336 to the other side of the lamp supply source 319. Sequence relay 80 restores and at its contacts 82 interrupts the energizing circuit for the fourth nail switch control relay 45 to release same and at its contacts 84 interrupts the energizing circuit for the third pilot lamp 353 to effect the extinguishment thereof.

As the third counting chain relay 130 now restores, it is effective at its contacts 135 to interrupt the holding circuit for the fourth counting chain relay 140 and the first sequence relay 100. It will be remembered that in setting the sequence switches to determine the number of operations in the cycle, switch 240 was not operated and accordingly contacts 241 are in the open condition. As a result the fourth counting chain 140 and sequence relay 100 will restore as the chain advances to this point.

The fourth pilot lamp is maintained operated following release of the fourth counting chain relay 140 and sequence relay 100 over a circuit extending from one side of the lamp supply 319 over conductor 335, lamp 354, contacts 243 of sequence switch 240, contacts 232, 222, 212, 103, 93, 83 and conductor 336 to the other side of the lamp supply source 319.

The illuminated pilot lamp 354 indicates to the attendant that the machine is prepared to drive the nails in the fourth nailing pattern as preset on the control board. The material to be nailed is placed in position for the last nailing operation and the attendant operates the treadle 11 and associated switch 313 to initiate the fourth nailing operation. Treadle switch contacts 314 are responsively closed and an operating circuit is completed as before for the solenoid control switch 320 and the driving head control solenoid 317. The solenoid control switch 320 operates and at its contacts 321 prepares an energizing circuit for the nail selecting solenoids S1—S24 associated with the first nail selecting operation of the sequence, and at its contacts 322 completes a holding circuit for the solenoid control switch 320 and the driving head control solenoid 317 independent of the treadle switch contacts 314.

Driving head control solenoid 317 energizes and causes the hydraulic system to initiate downward movement of the driver head whereby the top limit switch 310 is operated and the initial operating circuit for the solenoid control switch 320 and the driving head control switch 317 is opened at contacts 312, the members 317 and 320 being held operated over the described holding circuit. Top limit switch 310 at its contacts 311 completes an energizing circuit for the counting chain control relay 305 which operates and at its contacts 306 completes an energizing circuit for the first counting chain relay 110, such circuit extending from negative battery over the winding of relay 110, contacts 105, 95, 85, conductor 337 and contacts 306 to the positive side of supply source 307.

Counting chain relay 110 operates and at its contacts 111 completes an energizing circuit for the first nail switch control relay 30 which operates, and at its contacts 31a—31x inclusive completes an energizing circuit for the solenoids associated with the nail switches which were originally adjusted to determine the pattern for the first nailing operation. The energized ones of the nail selecting solenoids operate as in the previous first operation of the machine cycle to select the nails which are to be driven in the first operation of the following cycle and to feed the selected nails into the nail tubes.

Relay 110 in its operation is also effective at its contacts 112 to complete an energizing circuit for the first pilot lamp 351, as before described; at its contacts 113 prepares a circuit for the second counting chain 120; and at its contacts 114 and 115 completes a series operating circuit with the first sequence relay 100, which is presently shunted by the original energizing circuit for relay 110.

As the driving head approaches its bottom limit, the nails in the chucks for the fourth nailing operation are driven into the material according to the pattern of the fourth operation and the bottom limit switch 315 is operated to effect at its contacts 316 the release of the solenoid control switch 320 and the driving head control 317. Solenoid control switch 320 restores to effect release of the solenoids energized to pick the nails for the first pattern and the driver head control solenoid 317 restores to cause the hydraulic control system to move the driver head upward to its normal position. As the driving head ascends, the top limit switch 310 interrupts the energizing circuit for the counting chain control relay 305 which restores and at its contacts 306 interrupts the shunt presently imposed on first counting chain relay 110 and sequence relay 100 to permit the operation thereof in series as before described.

As sequence relay 100 operates, it is effective at its contacts 105 to interrupt the energizing circuit for the fourth pilot lamp 354, and at its contacts 104 is effective to complete an energizing circuit for the first pilot lamp 351 whereby the attendant is informed that the equipment is ready to accomplish a second cycle of nailing operations.

It is seen from the foregoing that the nailing machine may be adjusted to provide a cycle comprised of a number of operations which are adjustable, the pattern of nails provided in each operation being also adjustable in an extremely simple manner. The work of the attendant is confined to the positioning of the material relative to the driving head and the momentary operation of the treadle switch 11 to initiate each operation of the cycle.

The driving head automatically descends to drive home the particular nails which are in the chucks during which period the pattern of nails for the next operation is loaded into the tubes. As the driving head ascends to its normal position the newly selected pattern of nails is loaded into the chucks.

The machine effects the selection of each successive pattern of nails and the feeding thereof from the tubes into the chucks as described until the complete cycle set upon the machine has been completed, the equipment thereafter automatically recycling to provide another set of operations in the manner described.

*Reset*

A particular feature of the present invention is the manner in which the machine equipment may be homed to zero from any point in the cycle. In machines known heretofore, as a bent or crooked nail enters the equipment to interfere with one of the nailing operations, it was necessary to first finish out the cycle which had been initiated. Such operation entails a large amount of time, and additionally requires the flushing out of the nail patterns for each remaining operation in the cycle without accomplishing a nailing operation. According to the present invention, the equipment may be homed to zero by operating the power energizing switches 348a, 348b and 348c to the "off" position, whereby each member of the all-relay control circuit will be restored and is prepared for a new cycle of operations. As treadle 11 is now operated by the attendant, the head is operated to pick up the first nail pattern registered on the board in the manner heretofore described and the equipment is ready for a new cycle.

It is noted that by arranging the second set of contacts on the sequence switches 210–290 inclusive to control the operating circuits for the indicating lamps 351–360, an indication of the particular nails present in the nailing chucks at any time is provided without resorting to the addition of further relay members and other complicated control circuits. Specifically, the second contact set of each sequence switch 210–290 is operable with movement of the switch to the "on" position to extend a series energizing circuit through the like contact on each of the sequence switches which is operated to the "on" position. However, the like contact on the first sequence switch which is operated to the "off" position extends this energizing circuit to the indicating lamp associated with the counting chain relay controlled thereby.

Thus, as the chain advances to the counting chain relay associated with the sequence switch which is operated to the "off" position, and the counting chain relay restores by reason of the open condition of the first set of contacts on the sequence switch, an energizing circuit is maintained for the proper indicating lamp by the sequence switches, whereby a proper indication of the nails in the chucks is maintained regardless of the fact that the counting chain is restored for a new cycle.

*Conclusion*

The novel control system set forth herein for use with automatic nailing machines is extremely practical in its application, flexible in its field adaptability, and dependable and reliable in service. The many features inherent in all-relay controls are included herein to provide an arrangement which includes many operating features which have not been known in the nailing machine art heretofore and which is a definite and desirable advancement in the nailing machine art.

The simplex type control system which automatically follows the dictates of the registrations on an associated control board provides an arrangement which permits the use of the machine in the fabrication of many different types of boxes involving countless types of patterns and cycles without involving any degree of time in changeover of the equipment.

The accurate indications provided by the indicating means on the control board teach the machine attendant at all times the actual pattern of nails which are present in the nailing chucks.

The utilization of novel sequence switches in determining the number of operations to be effected in each cycle, the point of recycling and the control of the energizing circuit for the last of a cycle is especially novel in that accurate indications are provided at all times without requiring the addition of further relay members and complex circuit arrangements.

The use of an all-relay counting chain insures provision of dependable and reliable operation in an extremely rapid manner and permits use of the nailing machine at its maximum rate of speed.

Other features including the provision of a solenoid control member which includes heavy duty contacts for effecting interruption of the solenoid circuits to prevent damage to the relay equipment of the control system, and the provision of a single nail switch control relay for each set of register switches whereby as many as twenty-four solenoids may be rendered effective at one time, are further advancements which inherently provide a more dependable and reliable type nailing machine control system.

These and other features of the invention which are believed to be new are set forth in the accompanying claims.

What is claimed is:

1. An automatic control system for feeding a plurality of articles to associated equipment in each of a plurality of predetermined operations, the pattern and number of articles fed in each operation being predeterminable and variable, a plurality of article selecting members, each of which is operable with energization to select an article from a group for delivery to the associated equipment, control means including a plurality of sets of switches for registering the pattern to be selected for each operation and a connecting chain arrangement for sequentially examining the patterns as registered on said switches and controlling said article selecting members to operate in accordance with the pattern registered thereon.

2. An automatic control system for feeding a plurality of articles to associated equipment in each of a plurality of predetermined operations, the pattern and number of articles fed in each operation being predeterminable and variable, a plurality of article selecting members, each of which is operable with energization to select an article from a group for delivery to the asociated equipment, control means including a plurality of sets of switches for registering the pattern to be selected for each operation, seqeunce switch means for determining the number of sets of switches to be rendered effective in a cycle, and the recycling of the equipment and a connecting chain arrangement for sequentially examining the patterns as registered on said switches and controlling said article selecting members to operate in accordance with the pattern registered thereon.

3. An automatic control system for feeding a plurality of articles to associated equipment in each of a plurality of predetermined operations, the pattern and number of articles fed in each operation being predeterminable and variable, a plurality of article selecting members, each of which is operable with energization to select an article from a group for delivery to the associated equipment, control means including a plurality of sets of switches for registering the various patterns to be fed by said article selecting members in each operation, sequence switch means for determining the particular sets of switches to be rendered effective in a cycle and for effecting the recycling of the equipment at the point indicated by the switch settings and reset means for interrupting said equipment operation prior to completion of an initiated cycle and preparing same to effect the first operation of the next cycle.

4. An automatic control system for feeding a plurality of articles to associated equipment in each of a plurality of predetermined operations, the pattern and number of articles fed in each operation being predeterminable and variable, a plurality of article selecting members, each of which is operable with energization to select an article from a group for delivery to the associated equipment, delivery means for feeding the articles to the associated equipment, control means including a plurality of sets of switches for registering the pattern to be selected for each operation, and a counting chain arrangement for examining the patterns registered on said switch sets and controlling said article selecting members to select a succeeding pattern of articles for a succeeding operation in a registered cycle prior to completion of the prior operation of the cycle.

5. An automatic control system for feeding a plurality of articles to associated equipment in each of a plurality of predetermined operations, the pattern and number of articles fed in each operation being predeterminable and variable, a plurality of article selecting members, each of which is operable with energization to select an article from a group for delivery to the associated equipment, control means including a plurality of sets of switches for registering the pattern to be selected for each operation, a counting chain arrangement for examining the pattern registered on said switch sets and controlling said article selecting members to sequentially select each of the article patterns represented thereby, and indicating means for indicating to the attendant the particular pattern which is selected at any given time in the cycle.

6. An automatic control system for feeding a plurality of articles to associated equipment in each of a plurality of predetermined operations, the pattern and number of articles fed in each operation being predeterminable and variable, a plurality of article selecting members, each of which is operable with energization to select an article from a group for delivery to the associated equipment, control means including a plurality of sets of register switches for registering the pattern to be selected for each operation, a counting chain arrangement including a first group of switching elements for rendering the registered patterns effective in a given order and a second group of switching elements for advancing the counting chain in sequence, switching means associated with each counting chain switch for rendering the associated set of register switches effective with energization of its corresponding counting chain switch, and circuit control means for rendering the effective pattern selecting equipment ineffective with the succeeding operation of a counting chain advancing relay.

7. An automatic control system for feeding a plurality of articles to associated equipment in each of a plurality of predetermined operations, the pattern and number of articles fed in each operation being predeterminable and variable, a plurality of article selecting members, each of which is operable with energization to select an article from a group for delivery to the associated equipment, control means including a plurality of sets of switches for registering the pattern to be selected for each operation, a counting chain arrangement for examining the patterns registered on said switch sets in a given sequence and controlling said article selecting members to select a pattern of articles in accordance with the registrations thereon, indicating means for indicating the particular pattern selected at any given time, and a plurality of sequence switch means including a first contact set on each switch for determining the number of operations in each cycle of the equipment and the point of recyclement of the equipment, a second contact set for controlling a point in the energizing circuit for said indicating means and the recycling thereof with the recycling of the counting chain means.

8. An automatic control system for a nailing machine in which a plurality of nails are selected and delivered over a plurality of nail tubes to associated chuck members in each of a plurality of predetermined operations, the pattern and number of nails fed in each operation being predeterminable and variable, said control system including a plurality of nail selecting members, each of which is operable with energization to select a nail from a group of nails for delivery to an associated tube member, control means including a plurality of sets of switches for registering the pattern of nails to be selected for each operation, and a counting chain arrangement for rendering the patterns registered on said switches effective in a given sequence and controlling said nail selecting members to sequentially select each pattern of nails registered on said nail sets.

9. An automatic control system for a nailing machine in which a plurality of nails are selected and delivered over associated nail tubes to adjustable chuck members in each of a plurality of predetermined operations, the pattern and number of nails fed in each operation being predeterminable and variable, said control system including a plurality of nail selecting members, each of which is operable with energization to select a nail from a group of nails for delivery to an associated tube member, control means including a plurality of sets of switches for registering the pattern of nails to be selected for each operation, a counting chain arrangement for controlling said nail selecting members to sequentially select each pattern of nails registered on said nail sets, and a plurality of sequence switches for determining the number of sets of register switches effective in each cycle and for controlling recycling of the equipment as each cycle is completed.

10. An automatic control system for a nailing machine in which a plurality of nails are selected and delivered over associated nail tubes to adjustable chuck members in each of a plurality of predetermined operations, the pattern and number of nails fed in each operation being predeterminable and variable and which includes a driving head operative in each single operation to drive the nails held in the chucks into the material and to thereafter effect reloading of the chucks from the tubes, said control system including a plurality of nail selecting members, each of which is operable with energization to select a nail from a group of nails for delivery to an associated tube member, control means including a plurality of sets of switches for registering the pattern of nails to be selected for each operation, a counting chain arrangement for controlling said nail selecting members to select each pattern of nails registered on the effective ones of said switch sets, and counting chain control means operative to control said counting chain to effect selection of a succeeding pattern of nails and the delivery thereof to said tubes during the period of driving of the previous pattern of nails disposed in the chucks.

11. An automatic control system for a nailing machine in which a plurality of nails are selected and delivered over associated nail tubes to adjustable chuck members in each of a plurality of predetermined operations, the pattern and number of nails fed in each operation being predeterminable and variable and which includes a driving head operative in each single operation to drive the nails held in the chucks into the material and to thereafter effect reloading of the chucks from the tubes, said control system including a plurality of nail selecting members, each of which is operable with energization to select a nail from a group of nails for delivery to an associated tube member, control means including a plurality of sets of switches for registering the pattern of nails to be selected for each operation, a counting chain arrangement for controlling said nail selecting members to select each pattern of nails registered on the effective ones of said switch sets, counting chain control means operative to control said counting chain to effect selection of a succeeding pattern of nails and the delivery thereof to said tubes during the period of driving of the previous pattern of nails disposed in the chucks, and indicating means for indicating the particular pattern of nails disposed in the chucks at any time.

12. An automatic control system for a nailing machine in which a plurality of nails are selected and delivered over associated nail tubes to adjustable chuck members in each of a plurality of predetermined operations, the pattern and number of nails fed in each operation being predeterminable and variable and which includes a driving head and actuating means for moving said head in a downward and upward stroke with each operation thereof, said head being operative in each downward stroke to drive the nails in the chucks into the material and being operative in the upward stroke to effect reloading of the chucks from the tubes, said control system including a plurality of nail selecting members, each of which is operable with energization to select a nail from a group of nails for delivery to its associated tube member, control means including a plurality of sets of switches for registering the pattern of nails to be selected for each operation, an all relay counting chain arrangement for controlling said nail selecting members to select each pattern of nails registered on the effective ones of said switch sets, counting chain sequence relays for controlling advancement of said counting chain with each operation of said driving head, and indicating means controlled to indicate the particular pattern of nails in the chucks at any time including a pilot lamp for each set of switches and an energizing circuit for each pilot lamp controlled by a corresponding counting chain relay and its associated chain sequence relay.

13. A control system as set forth in claim 12 in which each counting chain relay includes contacts responsive to operation thereof to prepare the energizing circuit for its associated pilot lamp, and contacts controlled by its associated counting chain sequence relay with its operation for completing said prepared circuit and simultaneously interrupting the circuit completed for the lamp associated with the previous switch set in the sequence.

14. A control system as set forth in claim 12 in which each counting chain relay is associated with a corresponding set of switches and each counting chain relay includes means for rendering its corresponding switch set effective with operation thereof, and in which its associated counting chain sequence relay includes a break contact set connected in the operating circuit for said switch set to interrupt such circuit with the subsequent energization thereof.

15. An automatic control system for a nailing machine in which a plurality of nails are selected and delivered over associated nail tubes to adjustable chuck members in each of a plurality of predetermined operations, the pattern and number of nails fed in each operation being predeterminable and variable, and which includes a driving head and actuating means for moving said head in a nail driving and a nail loading operation with each operation thereof, said control system including a plurality of nail selecting members, each of which is operable with energization to select a nail from a group of nails for delivery to its associated tube member, control means including a plurality of sets of switches for registering the pattern of nails to be selected for each operation, an all relay counting chain arrangement for controlling said nail selecting members to select each pattern of nails registered on the effective one of said switch sets, a counting chain control relay controlled to operate with each downward stroke of said head to complete an advancing circuit to said counting chain to thereby effect operation of the next relay in the chain and the selection and delivery of the next pattern to the tube members by the associated selecting member, indicating means for indicating to the attendant the nail pattern in said chucks at any time and counting chain sequence relays controlled by said counting chain control relay with each upward stroke of said head to control said indicating means to indicate the new nail pattern received by said chucks in the upward stroke of said head and to render the previous indicating means ineffective.

16. A control system as set forth in claim 15 in which each counting chain sequence relay includes a break contact set connected in the energizing circuit for the nail selecting members controlled by its associated counting chain relays.

17. An automatic control system for a nailing machine in which a plurality of nails are selected and delivered over a plurality of nail tubes to associated chuck members in each of a plurality of predetermined operations, the pattern and number of nails fed in each operation and the number of operations in each cycle being predeterminable and variable, said control system including a plurality of nail selecting members, each of which is operable with energization to select a nail from a group of nails for delivery to an associated tube member, the number of selecting members being determined by the maximum number of nails to be selected in any one operation, control means including a plurality of sets of switches for registering the pattern of nails to be selected for each operation, the number of switches in each set corresponding to the number of nail selecting members on the machine, and a counting chain arrangement for controlling said nail selecting members to select each pattern of nails registered on said sets of switches in a predetermined order, the number of members in said counting chain corresponding to the maximum number of operations required in any one cycle of the equipment.

18. A control system as set forth in claim 17 which includes a plurality of sequence switches for determining the number of operations to be conducted in a cycle, said sequence switches being one less in number than the maximum number of operations required in any one cycle, and a plurality of indicating lamps for indicating the particular pattern selected at any time, the number of indicating lamps corresponding to the number of sets of register switches.

19. A control system as set forth in claim 17 which includes a nail selection control relay for each set of register switches, such nail selection control relay being associated with a corresponding counting chain relay and controlled thereby to render effective the associated set of register switches.

20. An automatic control system for a nailing machine in which a plurality of nails are selected and delivered over associated nail tubes to adjustable chuck members in each of a plurality of predetermined operations, the pattern and number of nails fed in each operation being predeterminable and variable, said control system including a plurality of nail selecting members, each of which is operable with energization to select a nail from a group of nails for delivery to an associated tube member, control means including a plurality of sets of switches for registering the pattern of nails to be selected for each operation, a counting chain arrangement for controlling said nail selecting members to select in a predetermined order each pattern of nails registered on the effective ones of said switch sets, a holding circuit for each counting chain relay for maintaining same operated in the advancement of the chain to a succeeding member, and a sequence switch member for each counting chain member except the last movable alternatively between two positions, each sequence switch member including contact means for controlling a point in the holding circuit for its associated counting chain member and a point in the holding circuit of the next succeeding counting chain member, said contact means being operative with movement of said switch to one position to close said circuit and operative with movement of said switch to the other position to open said circuit, whereby with advancement of the chain to a member having its sequence switch operated to said other position the holding circuit for the corresponding chain member is interrupted and a recycle of the chain is initiated.

21. A control system as set forth in claim 20 which includes indicating means for indicating the particular pattern of nails selected at any given time, means controlled by each counting chain relay for controlling operation of its associated indicating means with delivery of a selected pattern to the chucks and a second contact means for each sequence switch operable with movement of its switch to said one position to extend an operating circuit over the like contacts of each succeeding switch in said sequence which is operated to said one position, the said contacts being operable with its switch moved to said other position to extend said prepared circuit to the indicating means associated with its counting chain relay to hold same operative following release of the chain and pending the initiation of a recycle of the chain.

22. An automatic control system for a nailing machine in which a plurality of nails are selected and delivered over associated nail tubes to adjustable chuck members in each of a plurality of predetermined operations, the pattern and number of nails fed in each operation being predeterminable and variable, said control system including a plurality of nail selecting solenoids, each of which is operable with energization to select a nail from a group of nails for delivery to an associated tube member, control means including a plurality of sets of switches for registering the pattern of nails to be selected by said solenoids for each operation, a counting chain arrangement for controlling said nail selecting solenoids to select each pattern of nails registered on said sets of switches, and a control relay including heavy duty contacts for interrupting the energizing current for the solenoid members following each nail selecting operation thereby.

23. An automatic control system for a nailing machine in which a plurality of nails are selected and delivered over a plurality of nail tubes to associated chuck members in each of a plurality of predetermined operations, the pattern and number of nails fed in each operation and the number of operations in each cycle being predeterminable and variable, a driving head and actuating means for controlling same to effect driving of the nails in the chucks in its downward movement and loading of the new pattern of nails in the chucks in each upward movement, said control system including a plurality of nail selecting solenoids, each of which is operable with energization to select a nail from a group of nails for delivery to an associated tube member, a solenoid control relay operated with each operation of said actuating means to prepare energizing circuits for said solenoid members, control means including a plurality of sets of switches for registering the pattern of nails to be selected for each operation, a nail switch control relay for each set of switches for rendering its associated set effective with operation, a counting chain arrangement for rendering the nail switch control relays effective in a given sequence, a counting chain control relay responsive to each downward nail driving stroke of said head to complete a chain advancing circuit to said chain to effect operation of a succeeding chain member and its associated nail switch control solenoid whereby energization of the nail selecting solenoids and selection of a succeeding pattern and delivery thereof to the tubes is effected during driving of a preceding pattern, limit means for effecting restoration of said solenoid control relay as said head reaches the bottom limit of its stroke, thereby opening the circuit of the nail selecting solenoids indicating means for indicating the nail pattern in the chucks at any given time, and a second limit means operative with upward movement of the driving head to operate said counting chain via said counting chain control relay to operate said indicating means to thus indicate the new pattern disposed in said chucks as the driving head ascends.

24. An automatic control system including a series of control paths over which a corresponding number of associated members are operatively controlled, a set of counting chain relays, a set of sequence relays for said counting chain, an incoming circuit for extending operating impulses to said counting and sequence chain to advance same, each impulse effecting operation of a counting chain followed by the operation of a sequence relay, contact sets on said counting chain relay, each set being connected to complete an energizing circuit for a corresponding one of the control units on said control paths with the energization of its associated counting chain relay, and contact sets on each of said sequence relays connected to interrupt the energizing circuit completed by the effective one of the counting chain relays with the following operation of its associated sequence relay.

25. An arrangement as set forth in claim 12 in which said sequence relays include a set of make contacts and a set of break contacts and means for completing an operating circuit for one sequence relay with each upward stroke of said driving head, and in which the energizing circuit for each pilot lamp is completed with the operation of the associated sequence relay to close its make contacts.

26. An automatic control system for a nailing machine in which a plurality of nails are selected and delivered over a plurality of nail tubes to associated chuck members in each of a plurality of predetermined operations, the pattern and number of nails selected in each operation and the number of operations in each cycle being predetermined and variable, and in which a driving head is operated to drive home each pattern of nails thus selected; a plurality of nail selecting members for selecting a nail from a group of nails for delivery to an associated tube member, control means including a plurality of sets of register switches for registering the pattern and nails to be selected for each operation, a plurality of sequence switches for determining the number of operations to be provided in each cycle of the equipment, a counting chain arrangement for controlling said nail selecting members to select each pattern of nails registered on said sets of switches in a cyclic manner, counting chain sequence relays, means for controlling advancement of said counting chain and said sequence relays with each operation of said driving head, and indicating means operative to indicate the particular pattern of nails in the chucks at any time, including a pilot lamp for each set of register switches, an energizing circuit for each pilot lamp, make and break contact sets on each of said sequence relays, a make and break contact set for each of said sequence switches, and means for extending the energizing circuit for the pilot lamp at times over the break contact of the sequence switch associated with the effective counting chain relay, the make contacts of the preceding sequence switches in the group, and the break contacts of the sequence relays, and at other times for extending said pilot lamp energizing circuit over the make contacts of one of said sequence relays, the break contacts of the remaining sequence relays and a contact on the effective one of the counting chain relays.

No references cited.